Oct. 3, 1939.  R. R. BOSTIC  2,174,775
HEADLIGHT
Filed Dec. 19, 1936  3 Sheets-Sheet 1
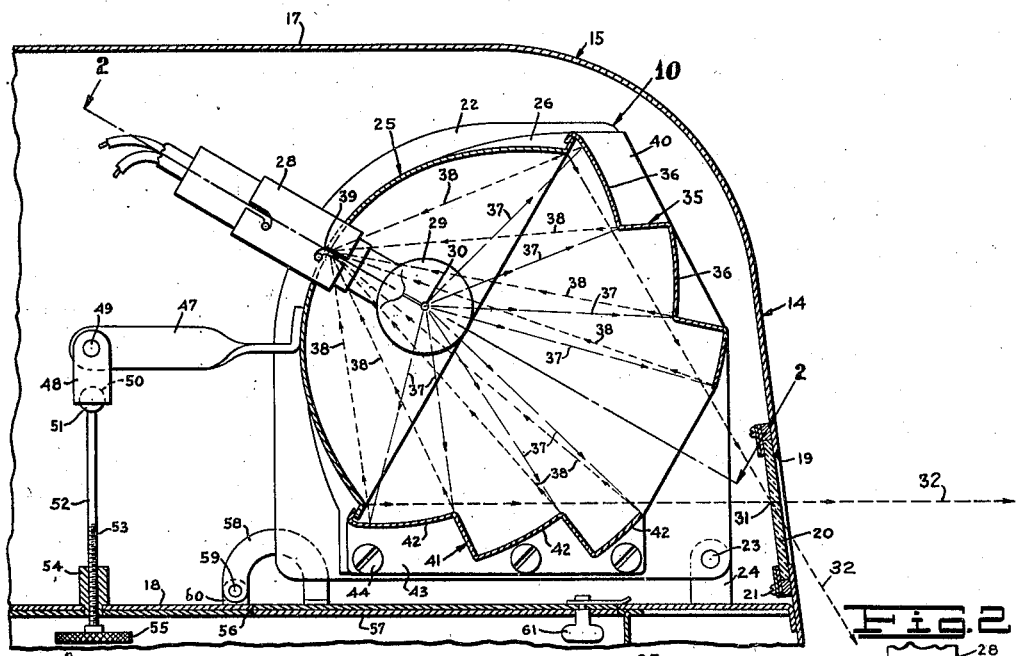
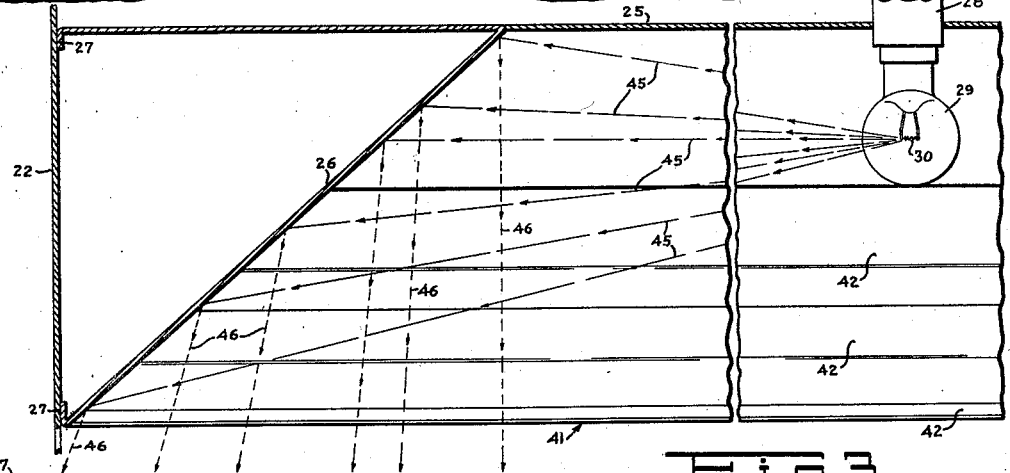
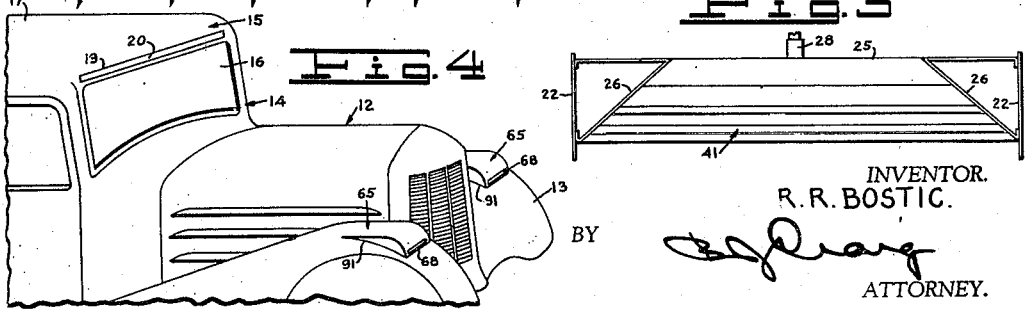
INVENTOR.
R. R. BOSTIC.
BY
ATTORNEY.

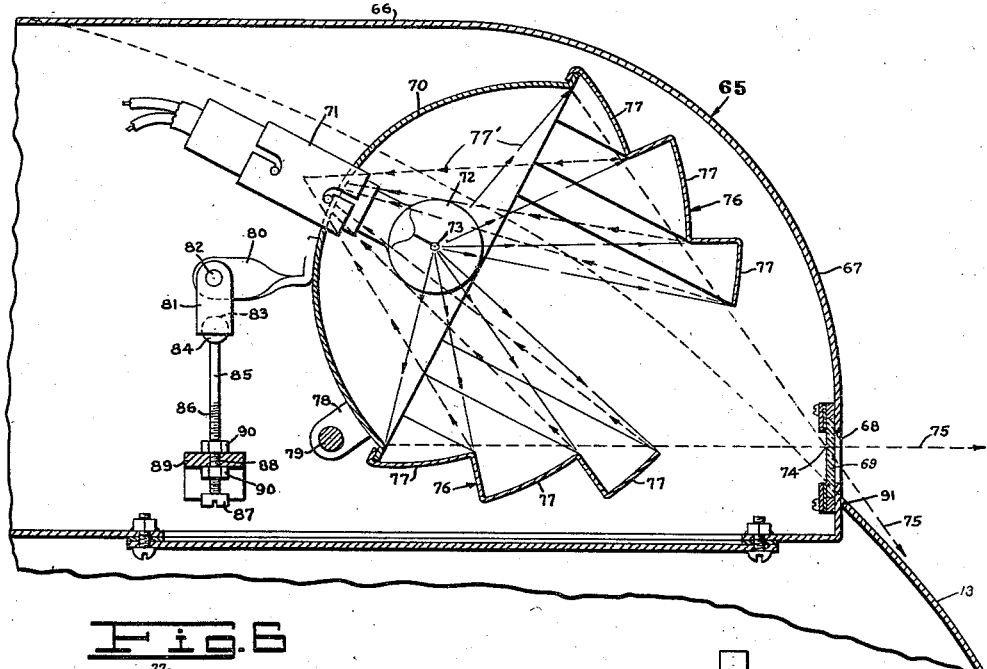
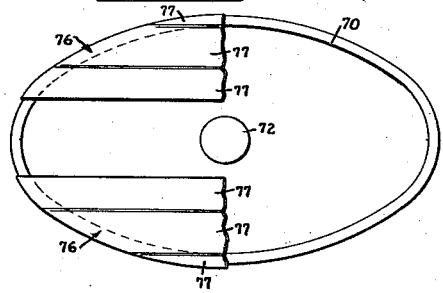
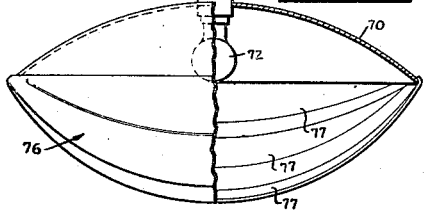
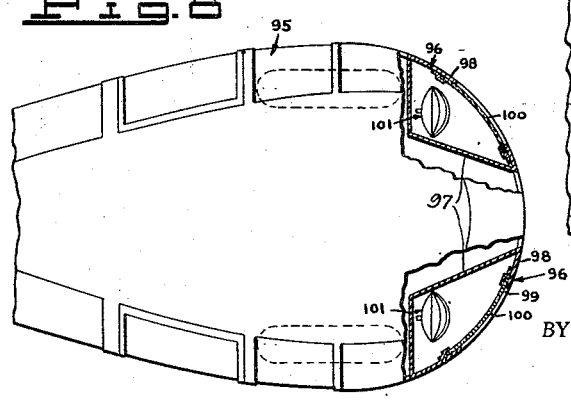
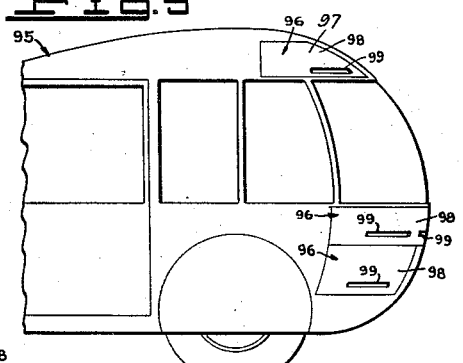

Oct. 3, 1939.　　　　R. R. BOSTIC　　　2,174,775
HEADLIGHT
Filed Dec. 19, 1936　　3 Sheets-Sheet 3
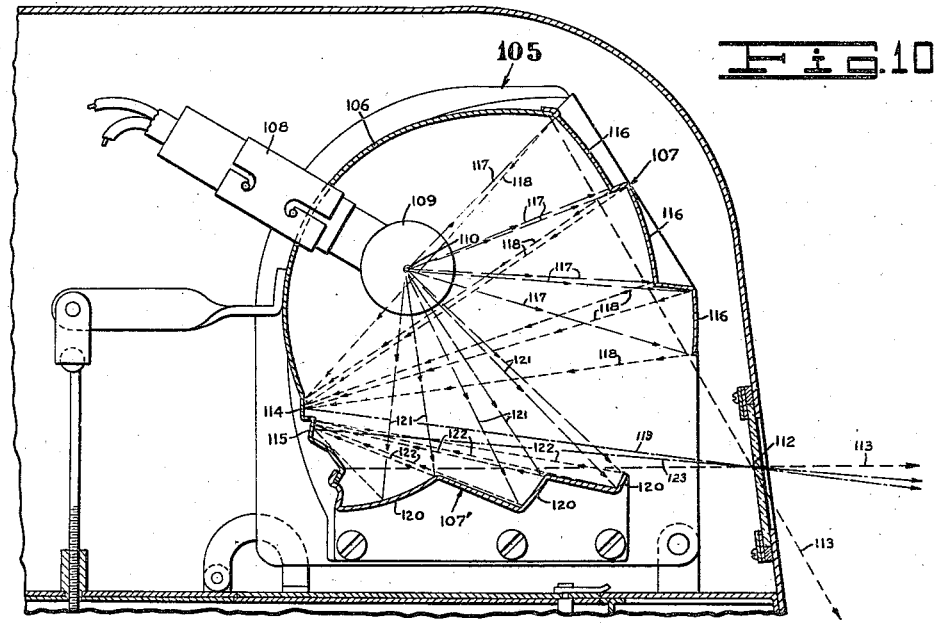
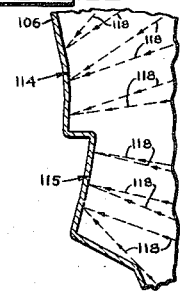
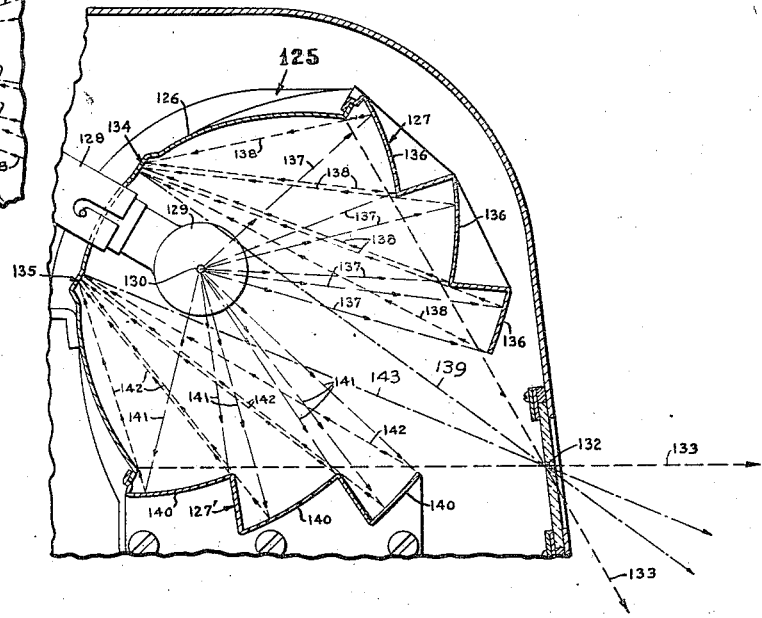
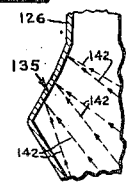
INVENTOR.
R. R. BOSTIC.
BY
ATTORNEY.

Patented Oct. 3, 1939

2,174,775

UNITED STATES PATENT OFFICE 2,174,775

HEADLIGHT

Ralph R. Bostic, Los Angeles, Calif.

Application December 19, 1936, Serial No. 116,779

1 Claim. (Cl. 240—7.1)

This invention relates to improvements in headlights.

The general object of the invention is to provide an improved headlight for use on vehicles such as automobiles and wherein the headlight is so constructed that ample and complete illumination is provided without dangerous glare.

A more specific object of the invention is to provide a headlight having novel reflector members so arranged that the lights are projected ahead and extend laterally but are not projected above a predetermined height.

Another object of the invention is to provide a novel type of headlight which is particularly adapted for use on stream-lined automobiles of the tear drop type.

A further object of my invention is to provide a headlight including a filament and a reflector wherein the reflector is so constructed that it is directed downwardly when installed in use to provide horizontal and inclined beams.

Another object of the invention is to provide a novel fender headlight for vehicles.

An additional object of my invention is to provide a novel reflector for headlights.

Other objects and the advantages of my invention will be apparent from the following description taken in connection with the accompanying drawings, wherein:

Fig. 1 is a fragmentary vertical section through a headlight embodying the features of my invention;

Fig. 2 is a fragmentary section of the reflector device taken on line 2—2 of Fig. 1;

Fig. 3 is a top plan view of the reflector device shown in Fig. 1 on a reduced scale;

Fig. 4 is a fragmentary perspective view of an automobile showing my improved headlights operatively mounted thereon;

Fig. 5 is a fragmentary vertical section through a modified form of headlight;

Fig. 6 is a front view of the reflector device shown in Fig. 5 on a reduced scale and with portions of the collector reflectors broken away;

Fig. 7 is a top plan view of the reflector device shown in Fig. 5 on a reduced scale and with portions of the collector reflectors broken away;

Fig. 8 is a fragmentary top plan view of a stream-lined automobile showing a modified form of headlight applied thereto;

Fig. 9 is a fragmentary side view of the device shown in Fig. 8;

Fig. 10 is a fragmentary vertical section through another modified form of headlight;

Fig. 11 is an enlarged fragmentary section of a portion of the reflector shown in Fig. 10;

Fig. 12 is a fragmentary vertical section through a further modified form of headlight; and Fig. 13 is an enlarged fragmentary section of a portion of the reflector shown in Fig. 12.

This application is a continuation in part of my prior application Serial No. 11,825 filed March 19, 1935, now Patent No. 2,064,880 granted December 22, 1936.

In the accompanying drawings I have shown my improved headlight 10 operatively mounted on an automobile which is indicated generally at 12. As shown the automble 12 includes front fenders 13, a closed body 14 having a top portion 15 and a windshield 16. As shown the top 15 of the automobile includes an outer portion 17 and a ceiling portion 18 spaced below the top portion 17.

The device 10 is positioned in the top 15 of the automobile in the space between the outer portion 17 and the ceiling portion 18 and adjacent the front of the automobile body. The automobile body 14 has an elongated aperture 19 therein above the wind shield 16 which is closed by a glass closure member 20. The glass closure member 20 may be secured to the body 14 in any desired manner as by rails and screws as indicated at 21.

As shown the device 10 includes a pair of spaced metal side plates 22 which adjacent their lower forward corners are pivoted as indicated at 23 to blocks 24 mounted on the ceiling 18. Between the end plates 22 I provide a metal reflector member 25 which is elliptical in vertical cross section and which is rectilinear in longitudinal section. At each end the reflector member 25 includes angular end walls 26 each of which include portions which are suitably secured as by welding to the adjacent end plate 22 as at 27. Intermediate the length of the reflector member 25 I mount an electric bulb socket 28 in which an electric light bulb 29 is positioned.

The reflector 25 being elliptical in cross section rays from the bulb filament 30 which is located at one focus striking the reflector are convergently reflected to the other focus 31 which is shown as at the rear of the glass closure member 20 as indicated by the dotted lines 32. The light rays as shown cross at the line 31 and then pass through the glass closure 20.

Extending from one end plate 26 to the other I provide a collector reflector 35 which comprises a plurality of reflectors or segments 36. Each of the segments 36 in cross section is a segment of an ellipse, one focus of the ellipse being located coincident with the filament 30 of the lamp and the other focus of the ellipse being coincident with a line 39 which is disposed substantially in the center of the reflector 25 as shown in Fig. 1 so that light rays indicated by the broken lines 37 from the bulb focus 30 are reflected as indicated by the dotted lines 38 to the focus 39 on the reflector 25 which focus is substantially intermediate the height of the reflector. The collector reflector 35 includes a flange portion 40 at each end which is suitably secured as by welding to the end plates 26.

Below the reflector 35 I provide another collector reflector 41 which is like the reflector 35 and include a plurality of elliptical sections 42 which are shaped to reflect the rays from the bulb filament 30 back to the focus 39 on the reflector 25. The reflector 41 has a flange portion 43 at each end which is removably secured to the end plates 26 by bolts 44.

Thus it will be seen that the majority of the rays from the filament 30 which do not originally strike the reflector 25 are eventually directed onto this reflector.

The inner faces of the angular end plates 26 are polished to form reflecting surfaces to reflect the rays from the filament 30 which strike them outwardly through the aperture 19.

The angle of the end plates 26 is shown as slightly over 45° relative to the longitudinal axis passing through the filament 30 so that the rays 45 from the bulb filament are reflected divergingly forward as indicated by the dotted lines 46 in varying degrees. That is, the rays striking the side plate farthest from the bulb will be reflected at a greater angle than the rays striking the end plates closer to the bulb. The rays striking the end plates closest to the bulb will preferably be reflected directly forward. The plates 26 may be hyperbolic in longitudinal section with substantially the same result secured.

Mounted on the rear of the reflector 25 I provide a bracket member 47 on which a member 48 is pivotally mounted as indicated at 49. The member 48 includes a ball socket portion 50 in which a ball member 51 is positioned. The ball member 51 has a stem 52 thereon which extends downward into the driver's compartment of the automobile. The stem 52 includes a threaded portion 53 which is positioned in a similarly threaded block 54 mounted on the ceiling 18.

In the driver's compartment the stem 52 has an enlarged head 55 thereon. By rotating the stem 52, reflectors 25, 35 and 41 may be swung about the axis of the pivots 23 to change the angle of the projected light rays.

The ceiling 18 has an aperture 56 therein which is closed by a closure member 57 which includes a hinge member 58 adjacent each end which is pivotally mounted as at 59 to a block member 60 mounted on the ceiling 18. The closure member 57 further includes a suitable fastening member 61 to retain it in a closed position.

In Figs. 5, 6 and 7 I have shown a modification of my invention in a headlight indicated generally at 65. As shown the device 65 includes a housing member 66 having a curved forward wall 67 which has an elongated aperture 68 therein shown as closed by a transparent closure member 69.

Positioned in the housing 66 I provide a reflector member 70 which in transverse section is in the shape of an ellipse. At the center of the reflector 70 I provide an electric bulb socket 71 in which an electric light bulb 72 is removably positioned.

In longitudinal section the reflector 70 is in the form of an ellipse so that when the bulb 72 is at one focus the light rays from the filament 73 striking the reflector will be convergently reflected to the other focus 74 which is at the rear of the closure member 69 as indicated by the dotted lines 75.

Above and below the reflected ray lines 75 I provide collector reflector members 76. Each of the collector reflectors extends from an end of the reflector 70 to the other and is outwardly curved toward the center. The reflectors 76 include segments 77 which are segments of ellipses and are shaped similar to the previously described collector reflectors 35 and 41 with one focus at the axis of the filament 73 and the other focus slightly in the rear of the reflector 70 so that they reflect rays from the bulb filament 73 back onto the reflector 70 as indicated at 77'.

As shown the reflector 70 has a lug 78 thereon which is pivotally mounted on a transverse rod 79. Mounted on the rear of the reflector 70 I provide a bracket member 80 on which a member 81 is pivotally mounted as at 82. The member 81 includes a ball socket portion 83 in which a ball member 84 is positioned. The ball member 84 has a stem 85 thereon which includes a threaded portion 86 and a screw head 87. The threaded portion 86 of the stem is positioned in a similarly threaded aperture 88 in a transverse bar 89 and on each side of the bar has a lock nut 90 thereon.

As shown in Fig. 4 the headlight 65 is preferably mounted in a suitable aperture 91 or recess in the front fenders 13 of the automobile 12.

In Figs. 8 and 9 I have indicated a substantially tear drop stream-lined automobile generally at 95 and have shown headlight members 96 operatively installed therein. As shown I employ two upper headlights, two lower headlights and three intermediate headlights although the number and arrangement may be varied.

As shown each of the headlight members 96 includes a removable housing 97 which includes a front wall 98 shaped to conform to the shape of the automobile body. The front wall has an elongated aperture 99 therein which is closed by a transparent closure member 100 which like the front wall is shaped to conform to the shape of the automobile body. Positioned in the housing 97 I provide a reflector member 101 which is shaped similar to the previously described reflector device 70.

In Figs. 10 and 11 I have indicated a modified form of reflector device generally at 105. As shown the device 105 is built similar to the device 10 and includes a reflector member 106 and an upper collector reflector member 107 and a lower collector reflector member 107'. Intermediate its length the reflector 106 receives an electric bulb socket 108 in which an electric bulb 109 is positioned.

The reflector 106 is elliptical in transverse cross section so that when the bulb filament 110 is at one focus the light rays from the filament striking the reflector will be convergently reflected to the other focus 112 as indicated by the dotted lines 113.

On the reflector 106 below the bulb 109 I provide a plurality of reflector surfaces which are indicated at 114 and 115 (see Fig. 11). The upper collector reflector 107 includes segments 116 which are segments of ellipses which are so shaped and placed that the light rays indicated by the broken lines 117 from the focus 110 are reflected as indicated by the dotted lines 118 onto the reflector set 114 on the reflector 106.

The rays from each segment 116 focus onto a different portion of the reflector surface of the reflector 114. The reflector surfaces of the set 114 are segments of such curvature and shape as to reflect the rays 118 from the part 116 onto the focus 112 as indicated by the broken line 119.

The lower collector reflector 107' includes parts 120 which are segments of ellipses which are so shaped that the light rays indicated by the broken lines 121 from the bulb filament 110 are reflected as indicated by the dotted lines 122 onto the reflector set 115 on the reflector 106. The rays from the parts 120 focus onto a different reflector surface of the reflector 115. The reflector surfaces of the set 115 like those of the set 114 are shaped to reflect the rays 122 from the parts 120 onto the focus 112 as indicated by the dotted lines 123.

In Figs. 12 and 13 I have indicated a modified form of reflector device generally at 125. As shown the device 125 is built similar to the device 10 and includes a reflector member 126 and an upper collector reflector member 127 and a lower collector reflector member 127'. Intermediate its length the reflector 126 receives an electric bulb socket 128 in which an electric bulb 129 is positioned.

The reflector 126 is elliptical in transverse cross section so that with the bulb filament 130 at one focus the light rays from the filament striking the reflector will be convergently reflected to the other focus 132 as indicated by the dotted lines 133.

On the reflector 126 above and below the bulb 129 I provide a plurality of reflector surfaces which are indicated at 134 and 135 (see Fig. 13). The upper collector reflector 127 includes segments 136 which are segments of ellipses which are so shaped and placed that the light rays indicated by the broken lines 137 from the bulb filament 130 are reflected as indicated by the dotted lines 138 onto the reflector set 134 on the reflector 126.

The rays from each segment 136 focus onto a different portion of the reflector surface of the reflector 134. The reflector surfaces of the set 134 are segments of ellipses and are shaped to reflect the rays 138 from the part 136 onto the focus 132 as indicated by the dotted lines 139.

The lower collector reflector 127' includes parts 140 which are segments of ellipses which are so shaped that the light rays indicated by the broken lines 141 from the bulb filament 130 are reflected as indicated by the dotted lines 142 onto the reflector set 135 on the reflector 126. The rays from the parts 140 focus onto a different reflector surface of the reflector 135. The reflector surfaces of the set 135 like those of the set 134 are segments of ellipses and are shaped to reflect the rays 142 from the parts 140 onto the focus 132 as indicated by the dotted lines 143.

From the foregoing description it will be apparent that I have invented a novel headlight which is efficient in directing the rays to the proper course and wherein the headlight is of such a nature that it can be economically manufactured and installed.

Having thus described my invention, I claim:

In a headlight for a tear-drop stream-lined automobile, a housing adapted to be placed in a vehicle, said housing having a front wall conforming to the contour of the vehicle on which it is to be placed, said front wall having an elongated aperture therein, a transparent closure for said aperture, said closure conforming to the contour of the vehicle on which the housing is to be placed, said housing including a rear wall portion and a side wall portion, a reflector in said housing, a lamp in said housing, said reflector including reflecting surfaces disposed to direct rays from said lamp through said aperture and means to adjust said reflector relative to said closure.

RALPH R. BOSTIC.